US007929770B2

United States Patent
Arai

(10) Patent No.: US 7,929,770 B2
(45) Date of Patent: Apr. 19, 2011

(54) HANDWRITING PROCESSING APPARATUS AND METHOD

(75) Inventor: Tsunekazu Arai, Tama (JP)

(73) Assignee: Canon Kabushiki Kaisha, Tokyo (JP)

(*) Notice: Subject to any disclaimer, the term of this patent is extended or adjusted under 35 U.S.C. 154(b) by 1001 days.

(21) Appl. No.: 11/751,726

(22) Filed: May 22, 2007

(65) Prior Publication Data

US 2007/0274590 A1  Nov. 29, 2007

(30) Foreign Application Priority Data

May 26, 2006  (JP) ................................. 2006-147161

(51) Int. Cl.
*G06K 9/00* (2006.01)
(52) U.S. Cl. ........ 382/187; 382/185; 382/186; 382/188; 382/189; 382/224; 382/225; 382/226; 382/227; 382/228; 382/229
(58) Field of Classification Search .......... 382/185–189, 382/224–229
See application file for complete search history.

(56) References Cited

U.S. PATENT DOCUMENTS

| 5,428,692 A * | 6/1995 | Kuehl ........................... 382/204 |
| 6,785,417 B1 * | 8/2004 | Williamson et al. .......... 382/186 |
| 2006/0140479 A1 * | 6/2006 | Kongqiao et al. ............. 382/186 |

FOREIGN PATENT DOCUMENTS

| JP | 08-069455 | 3/1996 |
| JP | 09-091424 | 4/1997 |

* cited by examiner

*Primary Examiner* — Vikkram Bali
*Assistant Examiner* — Daniel Zeilberger
(74) *Attorney, Agent, or Firm* — Cowan, Liebowitz & Latman, P.C.

(57) ABSTRACT

A handwriting processing apparatus and method effective for search of, e.g., a document file including handwriting is provided. When a handwriting characters are input to a coordinate input unit as a search key, a corresponding character in a dictionary is recognized for each of the handwritten characters, a search unit searches for a text code stored in a document file storage unit based on a text code of the corresponding character if the corresponding character is recognized and the search unit searches for handwriting trail data stored in a handwriting trail storage unit based on a handwriting trail of the handwriting character if the corresponding character is not recognized, thereby finding a desired document file.

6 Claims, 17 Drawing Sheets

FIG. 4

| FILE HEADER | CHARACTER CODE OF FIRST CHARACTER | CHARACTER CODE OF SECOND CHARACTER | CHARACTER CODE OF THIRD CHARACTER |
|---|---|---|---|
| CHARACTER CODE OF FOURTH CHARACTER | CHARACTER CODE OF FIFTH CHARACTER | CHARACTER CODE OF SIXTH CHARACTER | CHARACTER CODE OF SEVENTH CHARACTER |
| CHARACTER CODE OF EIGHTH CHARACTER | CHARACTER CODE OF NINTH CHARACTER | CHARACTER CODE OF 10TH CHARACTER | ... |
| TERMINAL CODE OF TEXT | UNRECOGNIZABLE CHARACTER TRAIL DATA 1 | UNRECOGNIZABLE CHARACTER TRAIL DATA 2 | ... |
| TERMINAL CODE OF CHARACTER TRAIL DATA | | | |
| | | | |
| | | | |

F I G. 10
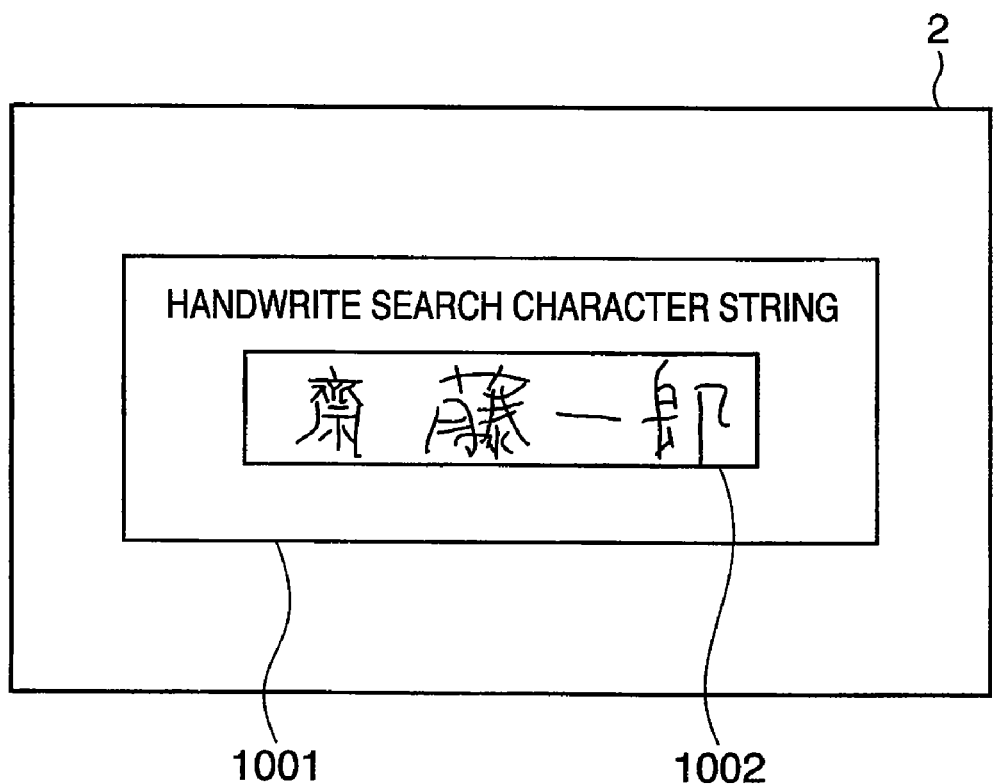

| MATCHING TEXT | RELATIVE SIZE | FILE NAME |
|---|---|---|
| 書図 | 80% | PROCEEDING 3 |
| 書図 | 40% | PROCEEDING 4 |

SEARCH RESULT LIST

HANDWRITING PROCESSING APPARATUS AND METHOD

BACKGROUND OF THE INVENTION

1. Field of the Invention

The present invention relates to a handwriting processing apparatus and method suitable for processing, e.g., a document file that records a handwriting trail.

2. Description of the Related Art

Conventionally, Japanese Patent Laid-Open Nos. 9-91424 and 8-69455 disclose apparatuses for searching handwritten characters.

Japanese Patent Laid-Open No. 9-91424 relates to an apparatus comprising a means for inputting stroke data, and a search stroke setting means for setting, as a search target, a key stroke which is discriminated from a plurality of input strokes. This apparatus further comprises a search means for searching for the key stroke based on the input stroke and, based on the search key stroke, specifying group information containing the found key stroke from a plurality of pieces of group information stored in a storage means.

Japanese Patent Laid-Open No. 8-69455 relates to an apparatus for recognizing, e.g., a symbol in a document based on the similarity between the symbol and character pattern information registered in a dictionary. This apparatus comprises a means for storing, as a recognition result, a plurality of character codes obtained in correspondence with, e.g., a symbol that has a low similarity and should be rejected ordinarily.

In the search apparatus described in Japanese Patent Laid-Open No. 9-91424, a key stroke serving as a search key is set from input trail stroke data by the search stroke setting means. For this reason, to set a certain stroke in a document file as a key stroke, the setting operation is necessary each time. Any stroke without the setting is excluded from the search targets. It is therefore necessary to set effective strokes in advance as search keys, resulting in inconvenience for users.

The search apparatus described in Japanese Patent Laid-Open No. 8-69455 obtains a recognition result for a pattern with a low similarity to dictionary data so it cannot be expected to obtain the same recognition result every time. Depending on the similarities between character patterns and the shapes of symbols, even different symbols may exhibit the same combination of a plurality of character codes as recognition results. Hence, no practical search result can be expected.

In addition, the conventional search apparatuses cannot take into account information (e.g., the size and writing pressure upon input) unique to a handwriting when performing a search.

SUMMARY OF THE INVENTION

It is an object of the present invention to provide a handwriting processing apparatus and method effective for search of, e.g., a document file containing handwriting.

According to one aspect of the present invention, a handwriting processing apparatus comprising: an input unit configured to input a handwritten character; a dictionary which stores a shape of each of a plurality of characters; a recognition unit configured to recognize a corresponding character in the dictionary with respect to the handwritten character input to the input unit and determine a similarity between the handwritten character and the corresponding character by comparing the handwritten character with the shape of each of the characters stored in the dictionary; an assignment unit configured to assign a recognition disable code to the handwritten character as a character code if the similarity is less than a predetermined reference value and assign a text code of the corresponding character to the handwritten character as a character code if the similarity is not less than the reference value; and a storage unit configured to store the assigned character code, with handwriting trail data of the handwritten character corresponding to the recognition disable code if the assigned character code includes the recognition disable code.

Further features of the present invention will become apparent from the following description of exemplary embodiments with reference to the attached drawings.

BRIEF DESCRIPTION OF THE DRAWINGS

FIG. 4 is a view showing the structure of a document file handled in the first embodiment of the present invention;

FIG. 10 is a view showing an input example of a search character string;

FIG. 11 is a view showing an example of data stored in a search text buffer and a search trail buffer;

FIG. 17 is a view showing an example of a search result according to the second embodiment of the present invention.

DESCRIPTION OF THE EMBODIMENTS

Various exemplary embodiments, features, and aspects of the present invention will be described in detail below with reference to the drawings.

First Embodiment

Figure 1:
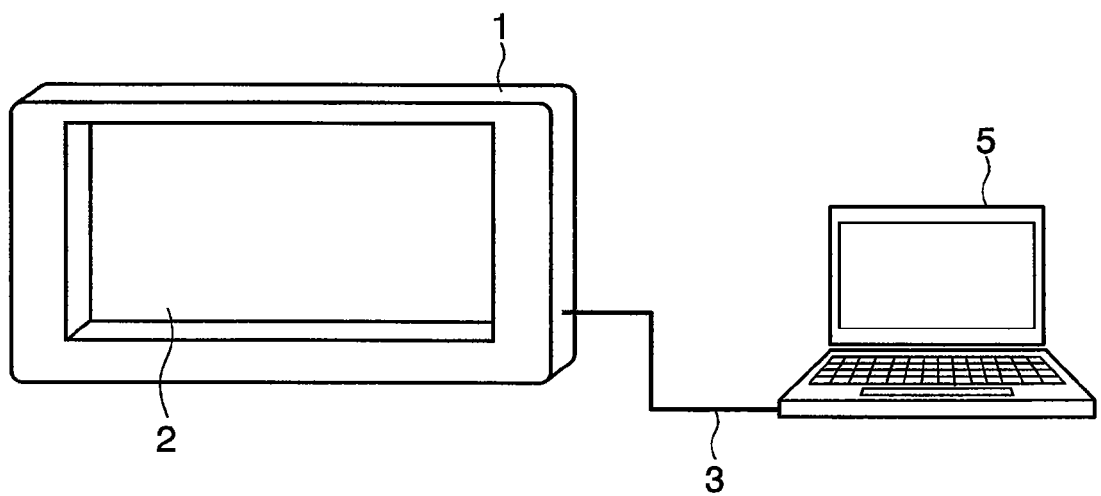
FIG. 1 is a view showing a handwriting processing apparatus according to the first embodiment of the present invention.

The first embodiment of the present invention will be described first. FIG. 1 is a view showing a handwriting processing apparatus according to the first embodiment of the present invention.

A handwriting processing apparatus 1 according to the first embodiment is, e.g., a personal digital assistant which is usable as a standalone device. Alternatively, the handwriting processing apparatus 1 may connect to a personal computer 5 via, e.g., a local area network 3, as shown in FIG. 1.

Figure 2:
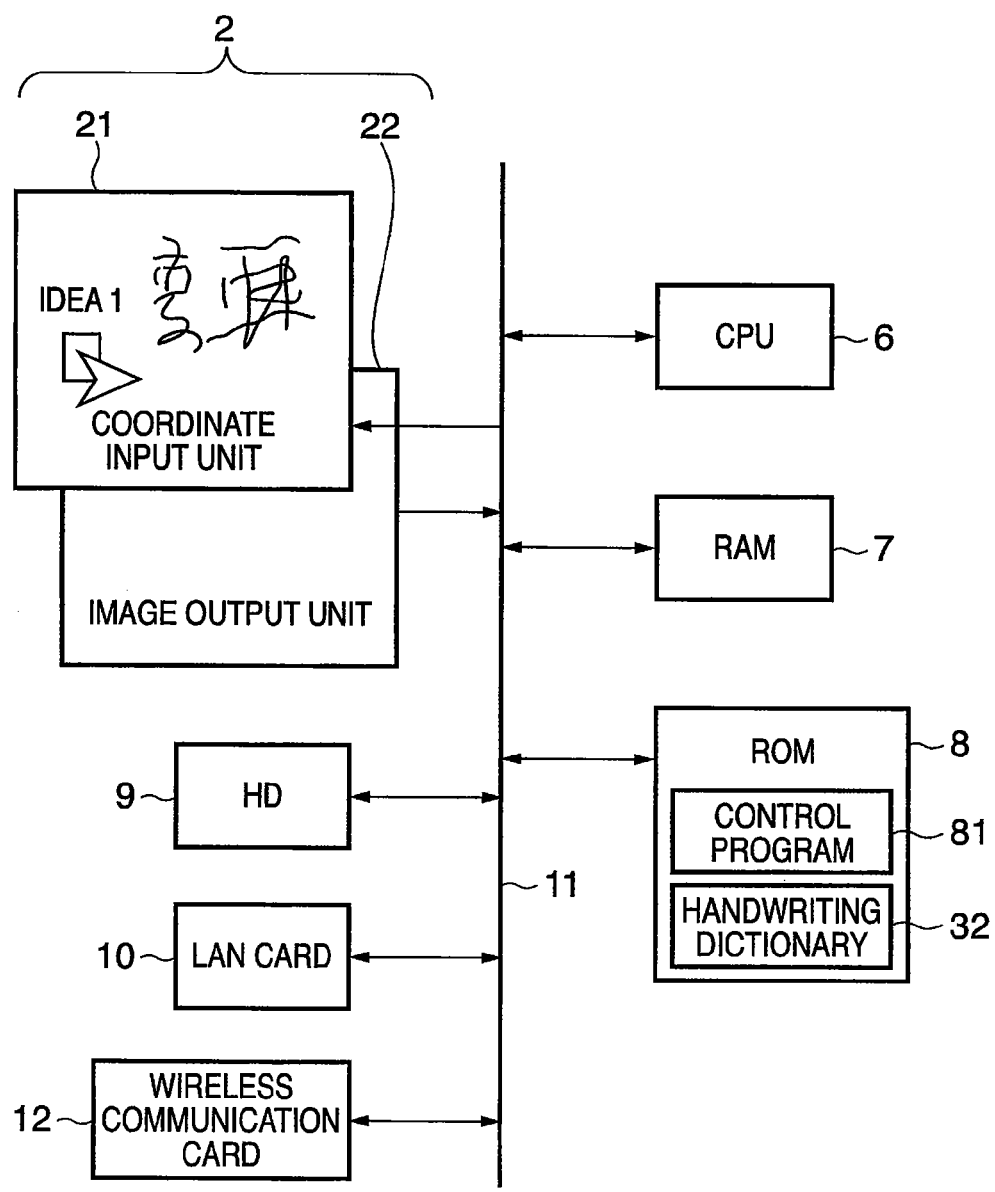
FIG. 2 is a block diagram showing the handwriting processing apparatus according to the first embodiment of the present invention.

As shown in FIG. 2, the handwriting processing apparatus 1 comprises a liquid crystal display 2 that functions as a coordinate input unit 21 and an image output unit 22. The handwriting processing apparatus 1 also comprises a CPU 6, RAM 7, ROM 8, hard disk (HD) 9, LAN card 10, and wireless communication card 12. The handwriting processing apparatus 1 also has a slot to receive a recording medium and an interface such as a USB to be used to connect another information device, although not illustrated. The handwriting processing apparatus 1 displays the trail of handwriting input to the coordinate input unit 21 by a process to be described later or searches for a document file in the HD 9.

The coordinate input unit 21 has a transparent resistive film digitizer and is therefore capable of reading the X-Y coordinate data of the trail of a pen. The coordinate input unit 21 connects to the CPU 6 via a system bus 11. The image output unit 22 having a liquid crystal display element, liquid crystal control circuit, and memory connects to the CPU 6 via the system bus 11. The image output unit 22 displays a handwriting trail or a character font based on an instruction from the CPU 6. When a handwriting is input onto the coordinate input unit 21, the image output unit 22 directly displays the trail. That is, the liquid crystal display 2 functions as a coordinate input unit integrated with a display that displays an input handwriting trail and a character font as a recognition result.

The CPU 6 connects to the RAM 7, ROM 8, and liquid crystal display 2 via the system bus 11 and executes a process to be described later based on a control program 81 stored in the ROM 8.

The RAM 7 is used to save handwritten characters and is also used as a work area for the CPU 6 to execute the program read out from the ROM 8.

The ROM 8 stores a handwriting process procedure and other application process procedure. The ROM 8 also stores the control program of the liquid crystal display.

The HD 9 is a compact hard disk used in, e.g., a general portable device and connects to the CPU 6 via the system bus 11. The HD 9 stores received document files and the like.

The LAN card 10 is the interface card of a general local area network. The handwriting processing apparatus communicates with another personal computer via the LAN card 10.

The system bus 11 is used to exchange, e.g., data among the CPU 6, RAM 7, ROM 8, and the like.

The wireless communication card 12 incorporates the controller and antenna of a wireless LAN. When a predetermined command is sent to the controller in the wireless communication card 12, the handwriting processing apparatus connects to the wireless local area network. The apparatus can communicate with another personal computer with a communication function to transmit/receive a digital image or control command. That is, information displayed on the screen of the handwriting processing apparatus 1 is shared, or a displayed search result can be sent to an external personal computer. A general transmission/reception protocol is usable.

Figure 3:
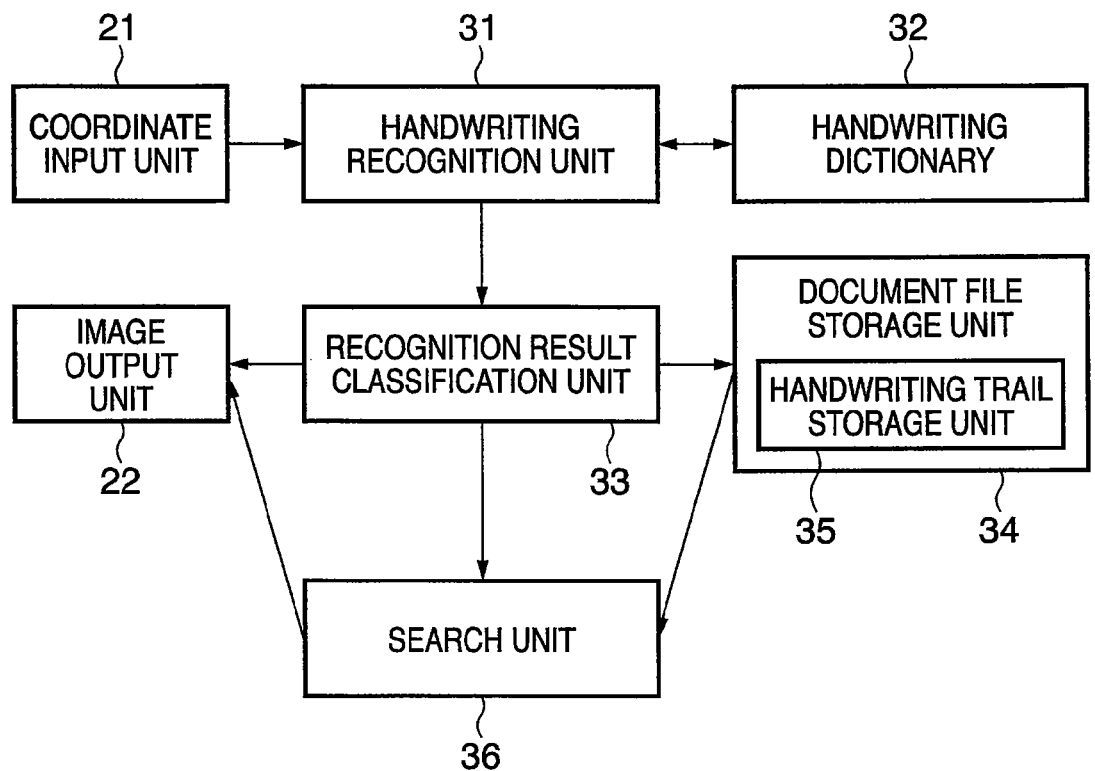
FIG. 3 is a functional block diagram showing the handwriting processing apparatus according to the first embodiment of the present invention.

A functional arrangement of the first embodiment will be described next. FIG. 3 is a functional block diagram showing the handwriting processing apparatus according to the first embodiment of the present invention. The units shown in FIG. 3 are constituted by the CPU 6 and the program stored in the ROM 8.

A handwriting recognition unit 31 extracts the feature points of a trail of handwriting written on the coordinate input unit 21 based on a general online handwriting recognition algorithm. The handwriting recognition unit 31 executes matching with a handwriting dictionary 32 and selects the most similar character pattern as a candidate character pattern. The handwriting dictionary 32 is stored in, e.g., the ROM 8. The handwriting dictionary 32 is prepared by extracting feature points from standard handwriting trail data based on a general algorithm and saving them as dictionary data in advance.

If the similarity between a process target character and a candidate character pattern selected by the handwriting recognition unit 31 is low, a recognition result classification unit 33 determines the process target character as an unrecognizable character.

A document file storage unit 34 stores, as text data, the character codes of the recognition result of a handwritten character string. For an unrecognizable character, the document file storage unit 34 stores a code indicating that the character is unrecognizable and a code representing the sequence of the unrecognizable character from the top as character codes. The document file storage unit 34 includes a handwriting trail storage unit 35. Upon creating a document file, the handwriting trail storage unit 35 stores the coordinate data of the handwriting trail of a character determined by the recognition result classification unit 33 as an unrecognizable character. That is, the document file storage unit 34 stores the text code of a character determined by the recognition result classification unit 33 as a recognizable character. For a character determined as an unrecognizable character, the document file storage unit 34 stores a code representing the sequence of the unrecognizable character from the top, and the handwriting trail storage unit 35 stores the coordinate data of handwriting trail. The document file storage unit 34 and handwriting trail storage unit 35 correspond to specific storage areas on, e.g., the HD 9.

When a character string is input to the coordinate input unit 21 as a search target, a search unit 36 searches for a text code stored in the document file storage unit 34 and/or handwriting trail coordinate data stored in the handwriting trail storage unit 35 based on the character string, thereby finding a desired document file. In this search, for a character determined by the recognition result classification unit 33 as a recognizable character, the search unit 36 searches for a text character based on the text code. For a character determined as an unrecognizable character, the search unit 36 searches for an unrecognizable character based on the trail.

The image output unit 22 displays a handwriting trail or a character font. For a character determined by the recognition result classification unit 33 as an unrecognizable character, the image output unit 22 continues to display the trail.

The operation of the handwriting processing apparatus having the above-described arrangement will be described next separately as a document file creation process and a document file search process.

The configuration of a document file will be described first. FIG. 4 is a view showing the structure of a document file handled in the first embodiment of the present invention. A document file has, at its head, a file header containing a file name and other information. A text follows as character codes. The character code of the first character, the character code of the second character, . . . , the character code of the 10th character, . . . , and the terminal code of the text exist. If an unrecognizable character is present, the trail X-Y position coordinate data of the unrecognizable character follows the terminal code of the text. For example, unrecognizable character trail data 1, unrecognizable character trail data 2, . . . , and the terminal code of unrecognizable character trail data exist. As described above, the character code of a recognizable character indicates a text code, and the character code of an unrecognizable character indicates the sequence of the unrecognizable character. To distinguish the character code of an unrecognizable character from a normal character code (text code), the character code of the first unrecognizable character in the file is set to, e.g., "FF01" and that of the second unrecognizable character is set to "FF02".

Figure 5:
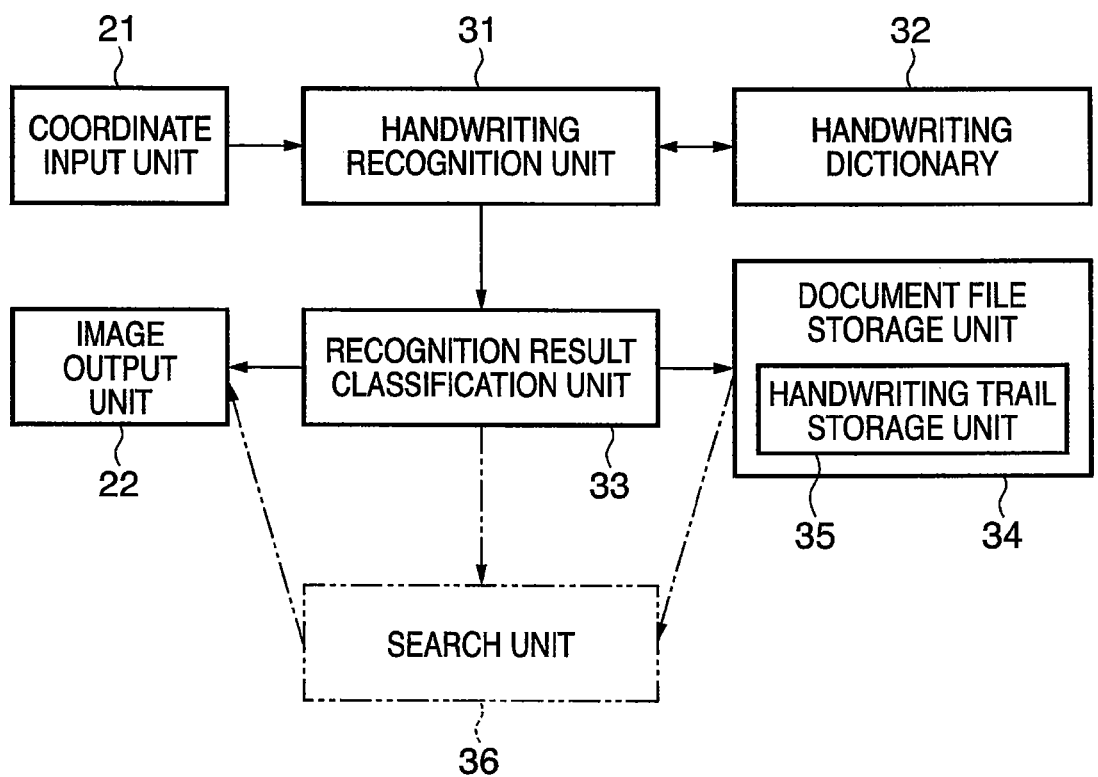
FIG. 5 is a view showing the operation of a document file creation process in the first embodiment of the present invention.
Figure 6:
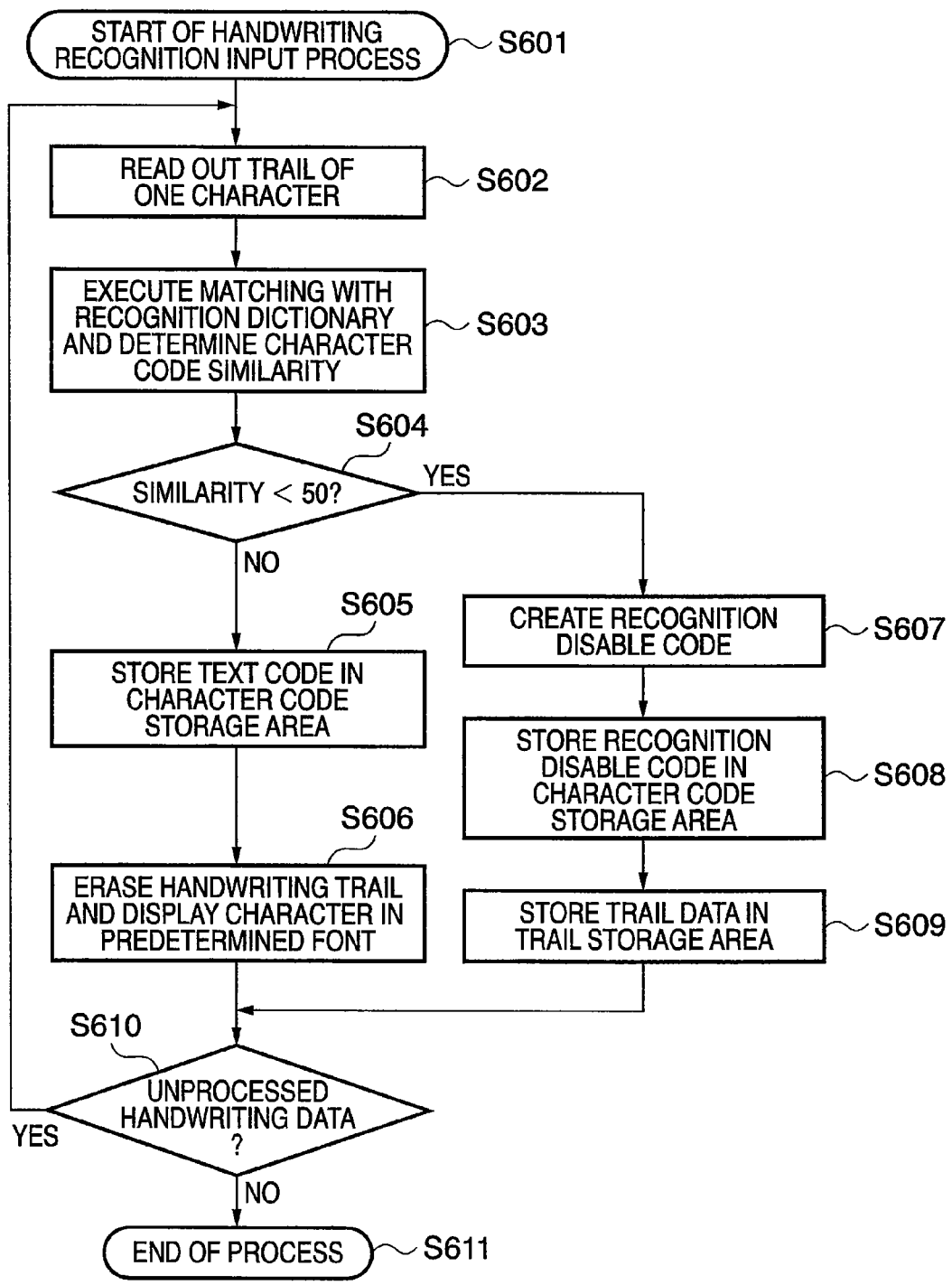
FIG. 6 is a flowchart illustrating the document file creation process in the first embodiment of the present invention.

A process of creating a document file (handwriting recognition input process) will be described. The document file is, e.g., a note on proceedings. FIG. 5 is a view showing the operation of the document file creation process in the first embodiment. FIG. 6 is a flowchart illustrating the document file creation process in the first embodiment. Before the document file creation process, a process of separating the trail data of a continuously handwritten character string into individual characters by a method based on the pen-up time or a method using a character input frame is completed.

First, in step S601, a work area and the like to be used for the handwriting recognition input process are initialized. Then, the handwriting recognition input process starts.

In step S602, the handwriting recognition unit 31 reads out the X-Y coordinate data of the handwriting trail of one character and stores it in a buffer area. The handwriting recognition unit 31 normalizes the input trail data and extracts feature points by using a general algorithm. The result is also stored in the buffer.

In step S603, the handwriting recognition unit 31 executes matching between the handwriting dictionary 32 and the coordinate data of one character stored in the buffer. In this matching process, the distance between feature point coordinate data included in the handwriting dictionary 32 and the feature point coordinate data of the handwritten character stored in the buffer is calculated. If a lot of matching X-Y position coordinate points are present, the similarity is evaluated as high. If X-Y position coordinate points largely differ, the similarity is evaluated as low. If the coordinate data completely match, the similarity is 100. Such matching is executed between the handwritten character and a plurality of character patterns included in the handwriting dictionary 32. The most similar character pattern is selected as a candidate character pattern.

In step S604, the recognition result classification unit 33 determines whether the similarity between the handwritten character and the candidate character pattern is lower than 50. If the similarity is lower than 50, the recognition result classification unit 33 determines that the handwritten character is not similar to the candidate character pattern, and the process advances to step S607. If the similarity is 50 or more, the recognition result classification unit 33 determines that the handwritten character is similar to the candidate character pattern, and the process advances to step S605.

In step S605, the recognition result classification unit 33 stores the text code of a text corresponding to the candidate character pattern with the similarity of 50 or more in the document file storage unit 34 as a character code. The document file storage unit 34 stores the text code in the internal character code storage area (FIG. 4) while making the position of the character on the coordinate input unit 21 identifiable (e.g., while making the sequence of the character identifiable).

In step S606, the image output unit 22 erases the handwriting trail input to the coordinate input unit 21 and displays the character indicated by the text code in a predetermined font. That is, for a candidate character pattern determined to have a similarity of 50 or more in step S604, the character code is regarded as reliable and directly handled as a text.

On the other hand, in step S607, the recognition result classification unit 33 create a recognition disable code as a character code. For example, a character code "FF01" is assigned to a character that is determined as unrecognizable for the first time in the document file. A character code "FF02" is assigned to a character that is determined as the second unrecognizable character in the document file.

In step S608, the recognition result classification unit 33 stores the recognition disable code in the document file storage unit 34 as a character code. The document file storage unit 34 stores the recognition disable code in the internal character code storage area (FIG. 4) while making the position of the character on the coordinate input unit 21 identifiable (e.g., while making the sequence of the character identifiable).

In step S609, the recognition result classification unit 33 stores the trail data of the unrecognizable character in the handwriting trail storage unit 35. The handwriting trail storage unit 35 stores the trail data in the internal trail data storage area (FIG. 4) while making the position of the unrecognizable character on the coordinate input unit 21 identifiable. More specifically, for example, the handwriting trail storage unit 35 stores the trail data in the internal trail data storage area while making the sequence of the unrecognizable character identifiable. When a handwritten character is input to the coordinate input unit 21, its trail is directly displayed on the image output unit 22. If the similarity is 50 or more, the display is switched, as described above. If the similarity is lower than 50, the image output unit 22 continues to display the trail.

After step B606 or S609, it is determined in step S610 whether unprocessed handwriting data remains. If unprocessed handwriting data exists, the process returns to step S602. If all handwriting data are processed, the process advances to step S611.

In step S611, the work area used for the handwriting recognition input process is released, and the handwriting recognition input process is ended.

An operation will be described using an example wherein two character strings "アイデア会議"and "出席者：齋藤一郎"are handwritten on the coordinate input unit 21, and only the character "齋"has a similarity lower than 50 with respect to the character pattern.

In association with "アイデア会議"of the first line, the text code of each character is stored in the character code storage area in the document file. On the other hand, in association with "出席者：齋藤一郎"of the second line, the text codes of "出席者：" are sequentially stored in the character code storage area in the document file. Then, the first recognition disable code (FF01) is stored, and the text codes of " 藤一郎" are sequentially stored. In addition, the X-Y position coordinate data of the handwriting trail of " "齋" is stored in the trail data storage area as the trail data of the first unrecognizable character.

Figure 7:
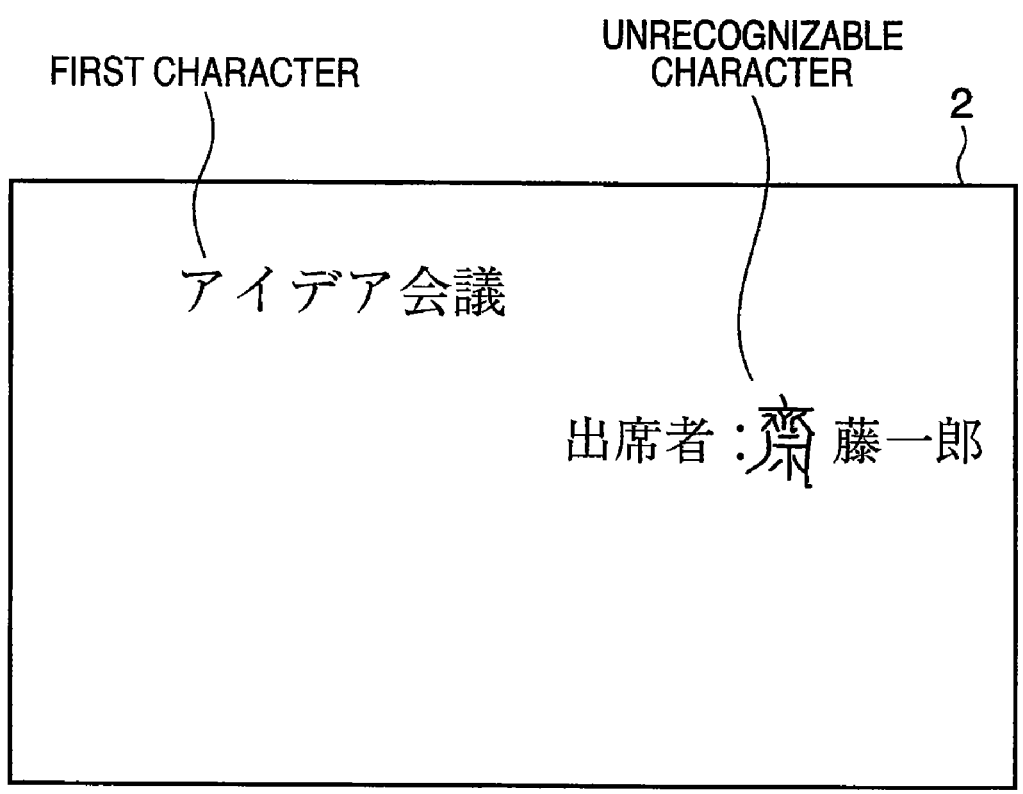
FIG. 7 is a view showing an example of a display screen of a liquid crystal display 2 when a handwriting recognition input process is ended.

The liquid crystal display 2 temporarily displays the handwriting trail of "アイデア会議"Then, the trail is erased. The character string "アイデア会議"is displayed in a predetermined font at the same position, as shown in FIG. 7. Then, the handwriting trail of "出席者：齋藤一郎"is temporarily displayed. Of this handwriting trail, the character strings "出席者："and 藤一郎"are erased. The character strings "出席者：'" and 藤一郎"are displayed in a predetermined font at the same position, as shown in FIG. 7. For the character "齋"the handwriting trail is left, as shown in FIG. 7.

As described above, in the document file creation process, a correctly recognized character is stored as a text code. For an unrecognizable character, a recognition disable code is assigned, and the X-Y position coordinate data of the handwriting trail is stored. On the image output unit 22 (screen), only correctly recognized characters are replaced with a predetermined font.

Figure 8:
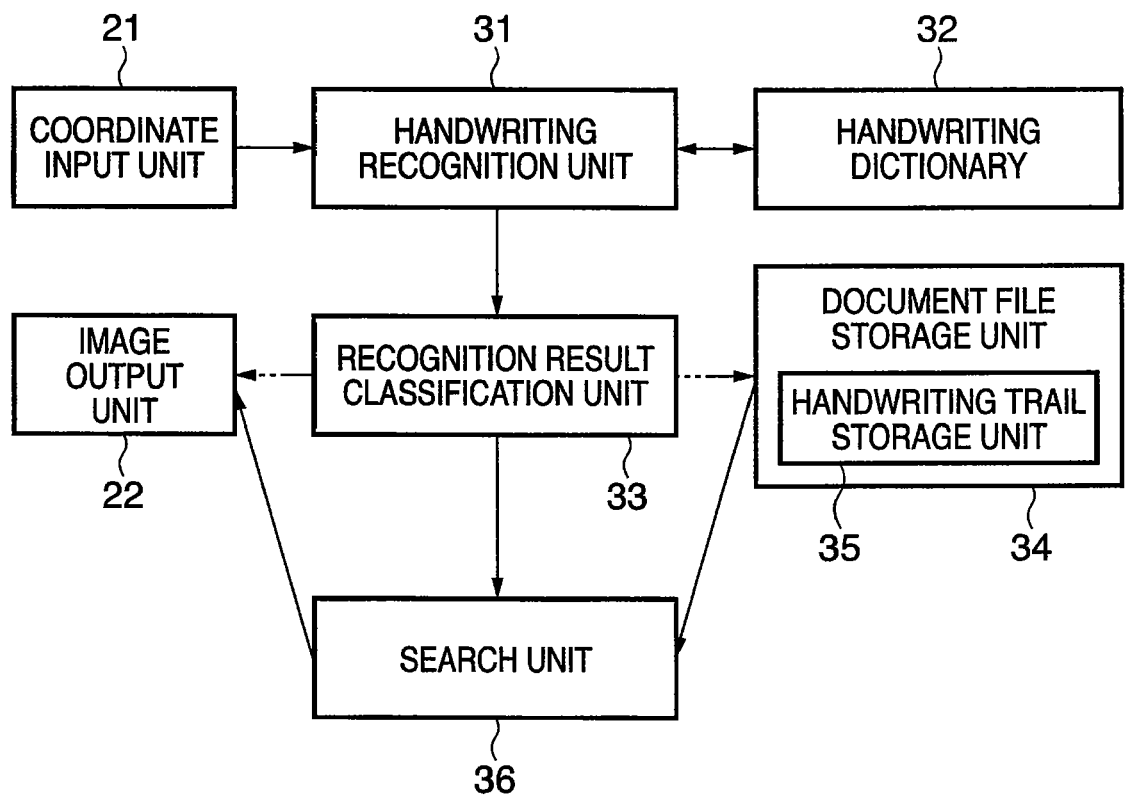
FIG. 8 is a view showing the operation of a document file search process in the first embodiment of the present invention.

A process of searching for a document file (handwriting search process) will be described next. FIG. 8 is a view showing the operation of a document file search process in the first embodiment. The process will be described here separately as a handwritten search character string recognition process (search handwriting input process) and a search process using a recognized search character string.

Figure 9:
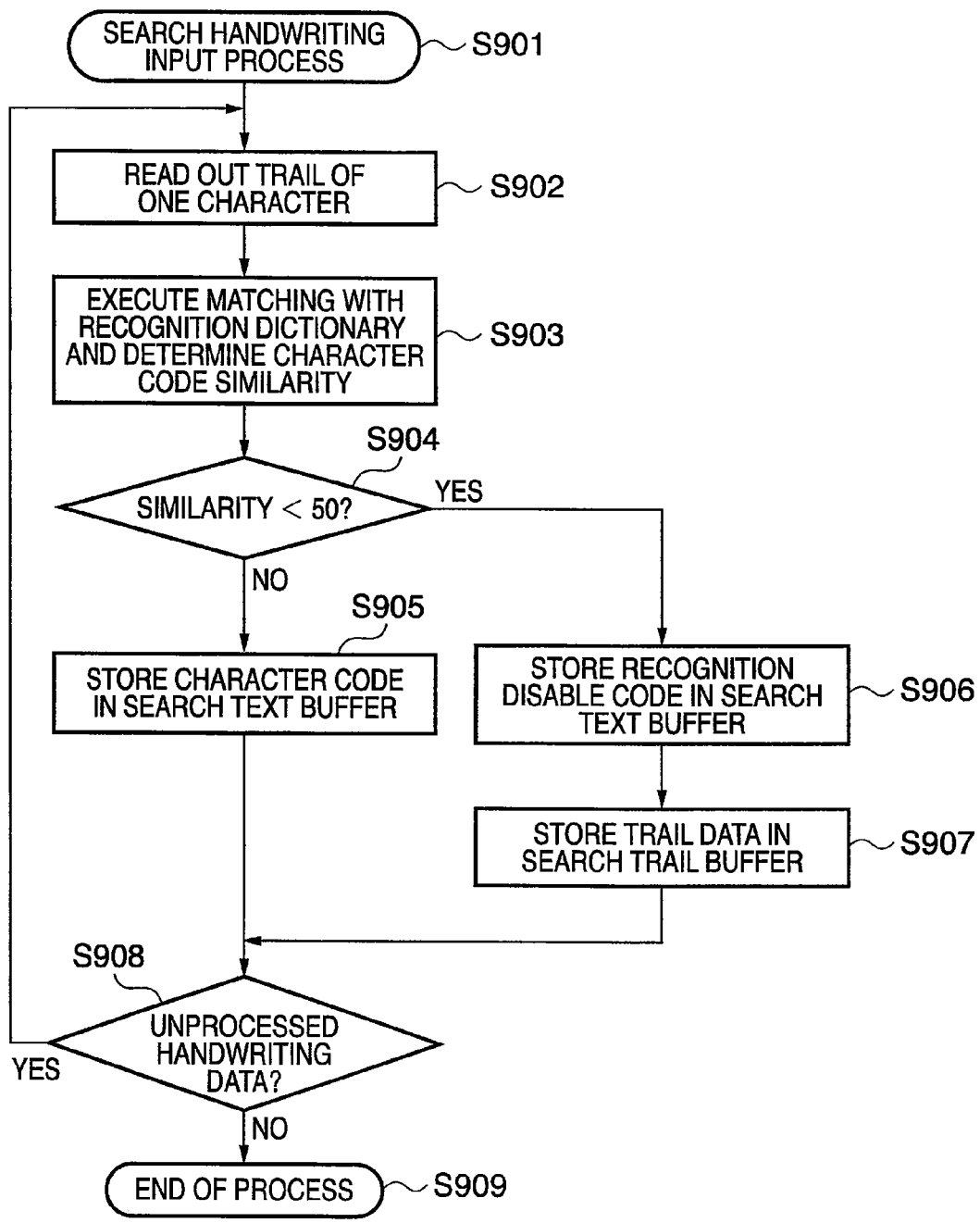
FIG. 9 is a flowchart illustrating a search character string recognition process in the first embodiment of the present invention.

A handwritten search character string recognition process (search handwriting input process) will be described first. FIG. 9 is a flowchart illustrating a search character string recognition process in the first embodiment. Before the search character string recognition process, a process of separating the trail data of a continuously handwritten character string into individual characters by a method based on the pen-up time or a method using a character input frame is completed.

First, in step S901, a work area and the like to be used for the search handwriting input process are initialized. Then, the search handwriting input process starts.

In step S902, the handwriting recognition unit 31 reads out the X-Y coordinate data of the handwriting trail of one character and stores it in a buffer area. The handwriting recognition unit 31 normalizes the input trail data and extracts feature points by using a general algorithm. The result is also stored in the buffer.

In step S903, the handwriting recognition unit 31 executes matching between the handwriting dictionary 32 and the coordinate data of one character stored in the buffer. In this matching process, the distance between feature point coordinate data included in the handwriting dictionary 32 and the feature point coordinate data of the handwritten character stored in the buffer is calculated. If a lot of matching X-Y position coordinate points are present, the similarity is evaluated as high. If X-Y position coordinate points largely differ, the similarity is evaluated as low. If the coordinate data completely match, the similarity is 100. Such matching is executed between the handwritten character and a plurality of character patterns included in the handwriting dictionary 32. The most similar character pattern is selected as a candidate character pattern.

In step S904, the recognition result classification unit 33 determines whether the similarity between the handwritten character and the candidate character pattern is lower than 50. If the similarity is lower than 50, the recognition result classification unit 33 determines that the handwritten character is not similar to the candidate character pattern, and the process advances to step S906. If the similarity is 50 or more, the recognition result classification unit 33 determines that the handwritten character is similar to the candidate character pattern, and the process advances to step S905.

In step S905, the recognition result classification unit 33 stores the text code of a text corresponding to the candidate character pattern with the similarity of 50 or more in the search text buffer (RAM 7) as a character code.

On the other hand, in step S906, the recognition result classification unit 33 create a recognition disable code as a character code. For example, a character code "FF01" is assigned to a character that is determined as unrecognizable for the first time in the document file. A character code "FF02" is assigned to a character that is determined as the second unrecognizable character in the document file. The recognition result classification unit 33 stores the recognition disable code in the search text buffer (RAM 7) as a character code.

In step S907, the recognition result classification unit 33 stores the trail data of the unrecognizable character in the search trail buffer (RAM 7).

After step S905 or S907, it is determined in step S908 whether unprocessed handwriting data remains. If unprocessed handwriting data exists, the process returns to step S902. If all handwriting data are processed, the process advances to step S909.

In step S909, the work area used for the search handwriting input process is released, and the search handwriting input process is ended.

An operation will be described by using an example wherein a character string 1002 "齋藤一郎"is input in a search character string input window 1001, as shown in FIG. 10, and only the character "齋"has a similarity lower than 50 with respect to the character pattern.

Figure 11:
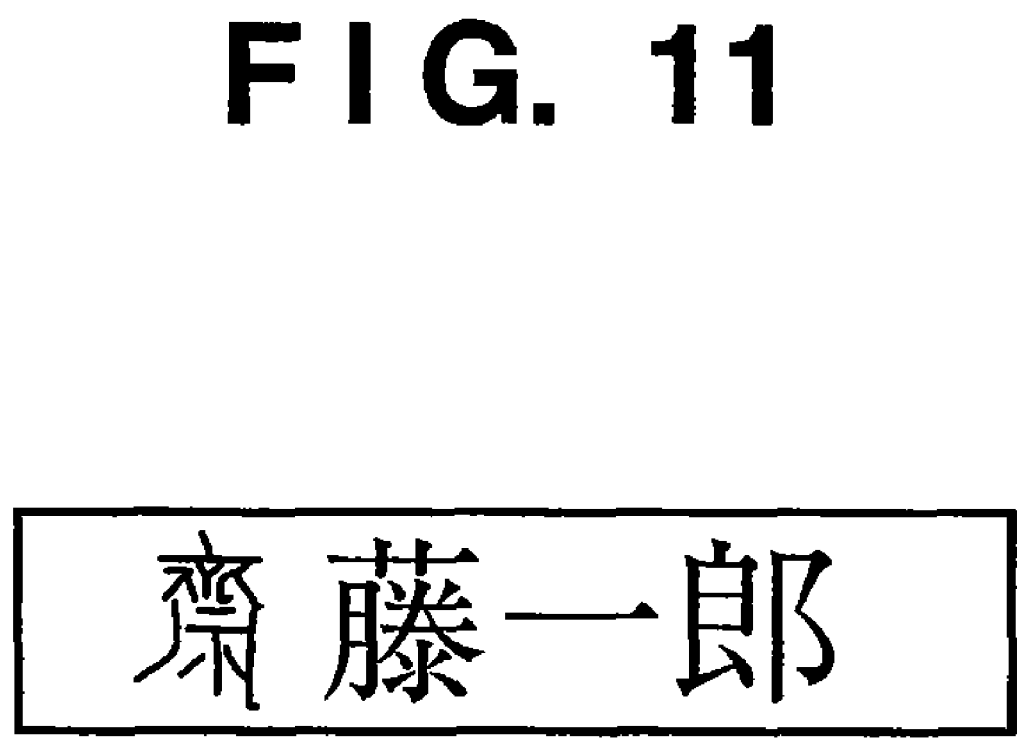

In this case, the first recognition disable code (FF01) is stored in the search text buffer, and the text codes of 藤一郎"are sequentially stored. In addition, the X-Y position coordinate data of the handwriting trail of "齋"is stored in the search trail buffer as the trail data of the first unrecognizable character. That is, data shown in FIG. 11 are stored in the search text buffer and search trail buffer.

Figure 12:
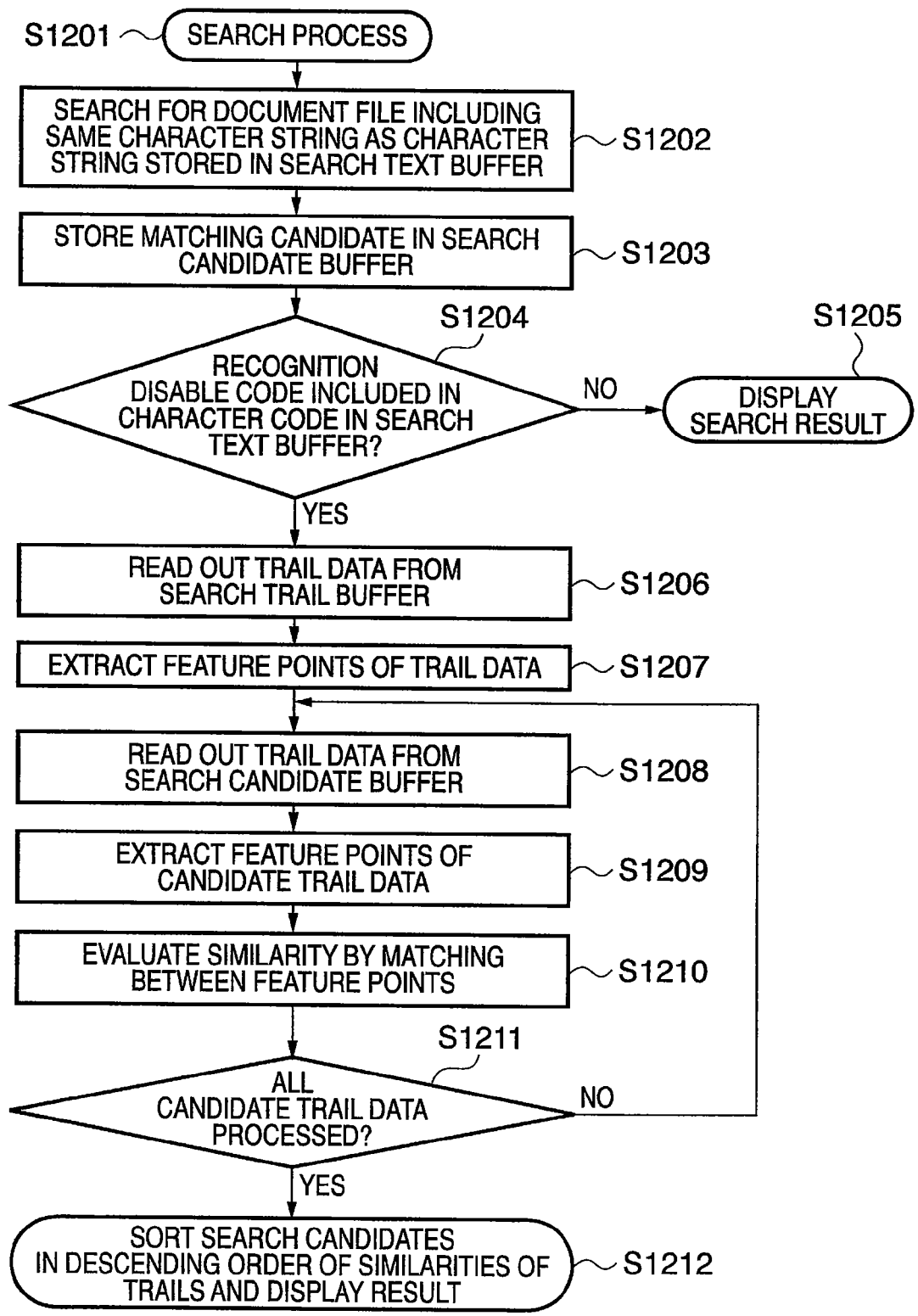
FIG. 12 is a flowchart illustrating a search process using a recognized search character string in the first embodiment of the present invention.

A search process using a recognized search character string in the first embodiment will be described next. FIG. 12 is a flowchart illustrating the search process using a recognized search character string in the first embodiment.

First, in step S1201, a work area and the like to be used for the search process are initialized. Then, the search process starts.

In step S1202, the search unit 36 searches for a document file including a character string identical to the character string stored in the search text buffer from all document files stored in the document file storage unit 34.

In step S1203, if a document file including matching character codes is present, the search unit 36 stores the character codes stored in the search text buffer and the name of the document file in the search candidate buffer (RAM 7). If the text codes match, and a recognition disable code is included, a document file including the recognition disable code at the same position is searched for and stored. For example, when the recognition result shown in FIG. 11 is obtained, the recognition disable code "FF01" and the text codes of "齋"" . . . ", and "郎"are stored in the search text buffer. Hence, the file name of a document file including a recognition disable code (e.g., "FF02") and the text codes of "齋"" . . . ", and "郎"is stored in the search candidate buffer.

In step S1204, the search unit 36 determines whether the character codes stored in the search text buffer include a recognition disable code. If no recognition disable code is included in the character codes, the process advances to step S1205. If a recognition disable code is included, the process advances to step S1206.

In step S1205, the search result is displayed. More specifically, the image output unit 22 displays the name of the document file stored in the search candidate buffer in step S1203. The process (steps S1201 to S1205) executed when no recognition disable code is included is the same as the conventional process.

If a recognition disable code is included, the search unit 36 reads out the trail data in the search trail buffer in step S1206. For example, when the recognition result shown in FIG. 11 is obtained, the trail data of the character "齋"corresponding to the recognition disable code is read out. If two or more unrecognizable characters are included in one character string, the trail data of each unrecognizable character is read out.

In step S1207, the search unit 36 extracts the feature points of the readout trail data. The feature point extraction is done by using the algorithm of, e.g., a general online recognition process. For example, the starting point, end point, intermediate point, ¼ point, and ¾ point of the trail are extracted as feature points.

In step S1208, the search unit 36 reads out, as candidate trail data, the trail data of the unrecognizable character included in a document file stored in the search candidate buffer. More specifically, the search unit 36 reads out handwriting trail data corresponding to the unrecognizable character in the document file including the character string by using the recognition disable code stored in the search candidate buffer. For example, if the character codes include two recognition disable codes "FF01" and "FF02", the first trail data in the document file is read out for "FF01", and the second trail data is read out for "FF02" (FIG. 4).

In step S1209, the search unit 36 reads out the feature points of the candidate trail data read out in step S1208. The feature point extraction is done in the same way as in, e.g., step S1207.

In step S1210, the search unit 36 evaluates the similarity between the feature points extracted in step S1207 and those of the candidate trail data extracted in step S1209. For example, if a lot of matching X-Y position coordinate points are present, the similarity is evaluated as high. If X-Y position coordinate points largely differ, the similarity is evaluated as low. That is, the similarity is evaluated as high when the distance between the feature points is short, whereas the similarity is evaluated as low when the distance between the feature points is long.

For example, when an unrecognizable character included in the search character string is formed from a plurality of strokes, the distance between the feature points of each stroke is calculated between the trail data and candidate trail data. The similarity between the most similar strokes is determined as the similarity of the stroke. This process is executed for each stroke, and the sum is defined as the similarity of the character. If the person who has input the search character string is identical to the person who has created the document file as the search target, the handwritings are considerably similar. If identical characters or graphics are input, the similarity is evaluated as high.

In step S1211, the search unit 36 determines whether the matching process of the trail data is ended for all search candidates including the unrecognizable character stored in the search candidate buffer. If the process is ended, the process advances to step S1212. If the process is not ended, the process returns to step S1208.

In step S1212, the search unit 36 sorts the search candidates in descending order of trail similarities. The image output unit 22 displays the result.

Figure 13:
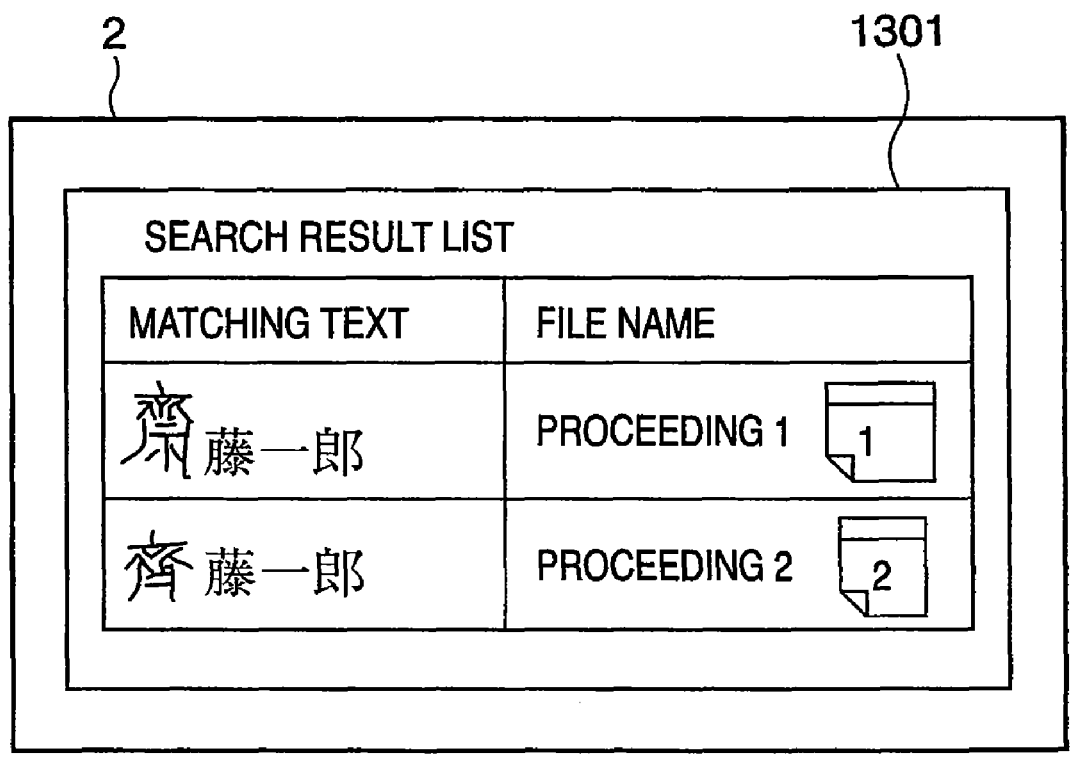
FIG. 13 is a view showing an example of a search result according to the first embodiment of the present invention.

For example, assume that the document file storage unit 34 stores two document files with names "proceedings 1" and "proceedings 2". A character string "齋藤一郎"is included in "proceedings 1". Only the character "齋"is stored as an unrecognizable character. A character string "齎藤一郎"is included in "proceedings 2". Only the character "齎"is stored as an unrecognizable character. Assume that the search character string shown in FIG. 10 is input. In this case, the trail data of the character "齋"included in the search character string is compared with the trail data of the characters "齋"and "齎"included in the two document files. Their similarities are compared in step S1212. The similarity of the character "齋"included in "proceedings 1" is higher than that of the character "齎"included in "proceedings 2". For this reason, "proceedings 1" is displayed as the first candidate, and "proceedings 2" is displayed as the second candidate, as shown in FIG. 13.

According to the first embodiment, it is possible to easily search for a document file including the handwriting trail of a character, sign, or graphic that is not registered in the handwriting dictionary 32.

Feature point extraction may be simplified, and a plurality of users may use the same handwriting signature. If a coordinate input device capable of recognizing even a writing pressure is used, writing pressure information can be added to the handwriting trail data to be stored. It is therefore possible to obtain a noise-free search result by narrowing down the search targets to only the writing patterns of a specific user.

Second Embodiment

Figure 14:
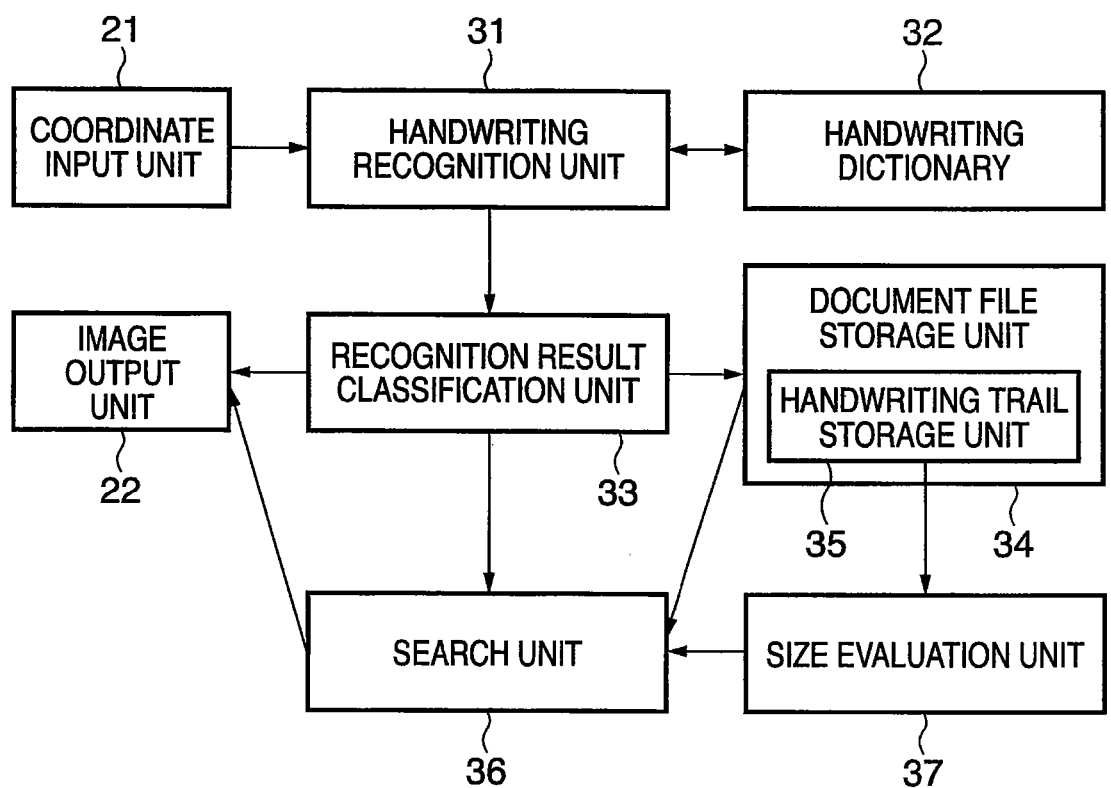
FIG. 14 is a functional block diagram showing a handwriting processing apparatus according to the second embodiment of the present invention.

The second embodiment of the present invention will be described next. In the second embodiment, relative size evaluation between document files is also executed for an unrecognizable handwriting trail, in addition the search of the first embodiment. The display order of search results is determined in consideration of even the evaluation result. In the second embodiment, an unrecognizable handwritten character is searched for. Handwriting is advantageous because a user can write, e.g., characters freely in a desired size, and the size itself can have information. The second embodiment makes use of this advantage. That is, in the second embodiment, search is done even by using the size of an unrecognizable handwritten character (e.g., handwritten mark) in a document. FIG. 14 is a functional block diagram showing a handwriting processing apparatus according to the second embodiment of the present invention.

In the second embodiment, a size evaluation unit 37 is provided. The size evaluation unit 37 evaluates the relative size of a handwriting trail with respect to the whole screen size of a document. The remaining components are the same as in the first embodiment.

Figure 15:
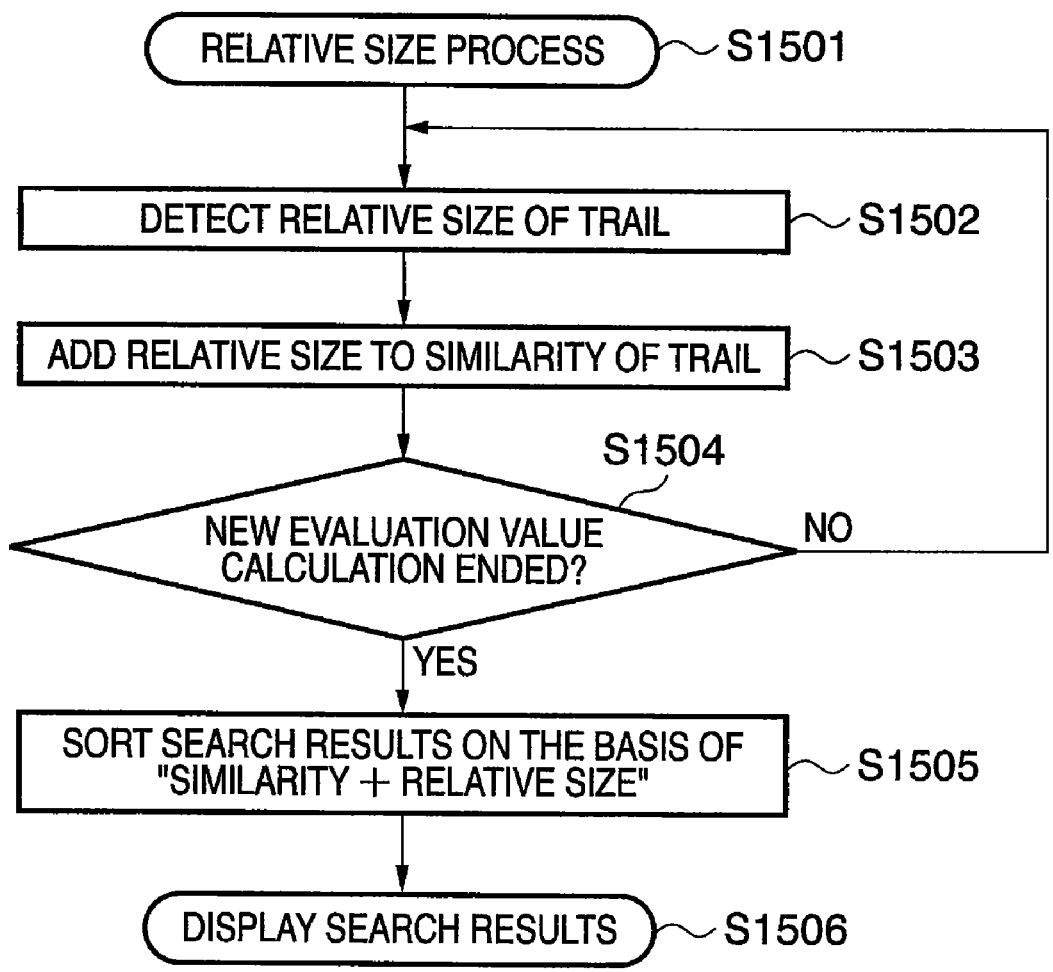
FIG. 15 is a flowchart illustrating a relative size evaluation process in the second embodiment of the present invention.

The operation of the second embodiment will be described next. In the second embodiment as well, the document file creation process and document file search process are executed. The document file creation file is the same as in the first embodiment. The document file search process is divided into a handwritten search character string recognition process and a search process using a recognized search character string, as in the first embodiment. The recognition process is the same as in the first embodiment. However, the contents of the search process are different from the first embodiment. In the search process of the second embodiment, the relative size of, e.g., a handwritten mark is evaluated after step S1211 of the first embodiment. The relative size evaluation process will be described below. FIG. 15 is a flowchart illustrating the relative size evaluation process in the second embodiment.

First, in step S1501, the size evaluation unit 37 initializes a work area and the like to be used for the relative size process and starts the relative size process.

In step S1502, the size evaluation unit 37 obtains the relative size of trail data included in each document file stored in the search candidate buffer by the search process shown in FIG. 12. For example, if a document file with a file name "proceedings 3" and a document file with a file name "proceedings 4" are stored in the search candidate buffer, the size evaluation unit 37 obtains the relative size of trail data included in each of these document files. The "relative size" indicates the ratio (occupied area ratio) of the area of a region with, e.g., a handwritten mark with respect to the area of the rectangular region capable of containing handwriting. For example, if "proceedings 3" has the contents shown in FIG. 16A, the "relative size" indicates the ratio of the area of the circumscribed rectangle of a handwritten "重要"mark 1602 with respect to the area of a rectangular region (region capable of containing handwriting) 1601. This can be expressed as "(area of circumscribed rectangle of handwritten "重要"mark 1602)/(area of rectangular region 1601)×100 (%)". Similarly, if "proceedings 4" has the contents shown in FIG. 16B, the relative size is expressed as "(area of circumscribed rectangle of handwritten "重要"mark 1604)/(area of rectangular region 1603)×100(%)".

In step S1503, the size evaluation unit 37 adds the relative size (%) to the similarity of the trail data. "Similarity of trail data+relative size" is defined as the new evaluation value of the trail.

For example, if the similarity of a pattern A (step S1210) is 80, and the relative size is 30%, the new evaluation value is 100. If the similarity of a pattern B (step S1210) is 80, and the relative size is 10%, the new evaluation value is 90.

In step S1504, it is determined whether the size evaluation unit 37 has obtained new evaluation values for all search candidates stored in the search candidate buffer. If all document files are processed, the process advances to step S1505. If an unprocessed document file exists, the process returns to step S1502.

In step S1505, a search unit 36 sorts the search candidates based on the new evaluation values obtained in step S1503. The search unit 36 sorts the search candidates in, e.g., descending order of new evaluation values. If handwritten marks have the same similarity, a document file with a larger relative size ranks high.

In step S1506, an image output unit 22 displays the search results based on the sort result in step S1505.

Figure 16A:
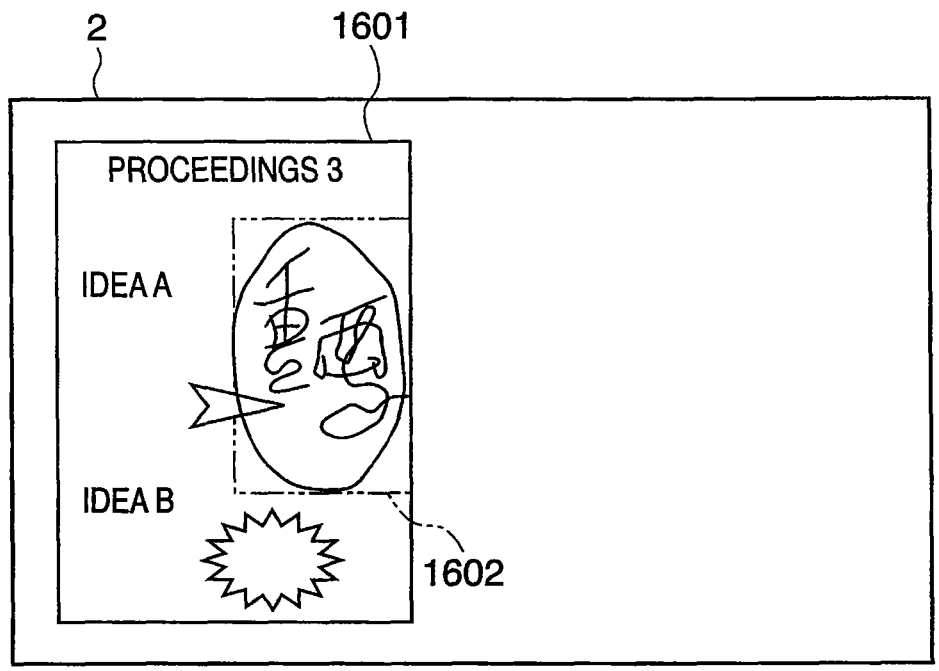
FIG. 16A is a view showing the contents of a document file "proceedings 3"
Figure 16B:
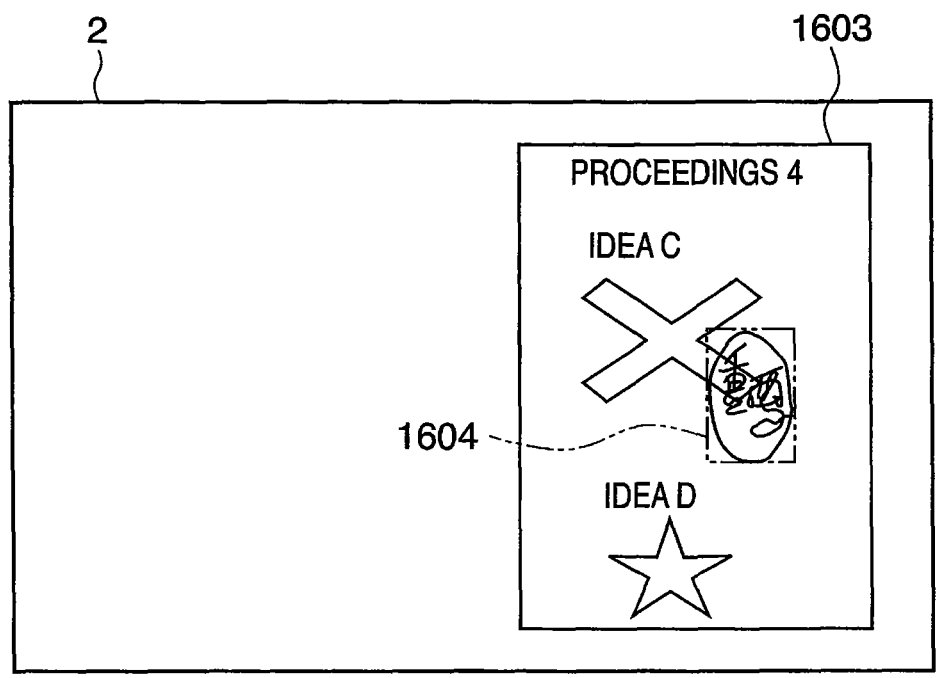
FIG. 16B is a view showing the contents of a document file "proceedings 4"

For example, when document files with the contents shown in FIGS. 16A and 16B are stored in a document file storage unit 34, the document file "proceedings 3" including the larger "重要"mark is displayed at a higher rank, as shown in FIG. 17. That is, the document file with the larger "重要"mark is preferentially displayed because it is determined that the mark size indicates the degree of significance.

According to the second embodiment, the relative size of a handwriting trail in a window is evaluated. A document including a larger mark is displayed at a higher rank in the search results.

If a coordinate input device capable of recognizing even a writing pressure is used, writing pressure information can be added to the handwriting trail data to be stored. The writing pressure information is also usable for search. More specifically, when writing pressure information is also added as an evaluation value, and two written patterns with the same size and same similarity are found, a pattern written with a higher writing pressure is determined to have a higher degree of significance and preferentially displayed at a higher rank in search results.

The writing pressure information may actively be used as search classification information. In this case, handwriting trails that are written for search and have similar shapes, sizes, and writing pressures are displayed as search results. It is therefore possible to obtain a noise-free search result by narrowing down the search targets to only the writing patterns of a specific user.

This allows to implement a handwriting trail search apparatus capable of selecting a document including a small handwriting trail with a low writing pressure from candidates including handwriting trails with similar shapes and displaying the selected document preferentially as a search result if a handwriting trail written for search is small, and the writing pressure is low.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-147, filed May 26, 2006, which is hereby incorporated by reference herein in its entirety.

What is claimed is:

1. A handwriting processing apparatus comprising:
a storage unit configured to store a character code of each character contained in a character string, with handwriting trail data of a handwritten character corresponding to a recognition disable code if the character code includes the recognition disable code;
an input unit configured to input a handwritten character for search;
a dictionary configured to store a shape of each of a plurality of characters;
a recognition unit configured to recognize a corresponding character in said dictionary with respect to the handwritten character for search based on a similarity between the handwritten character for search input to said input unit and the shape of each of the characters stored in said dictionary;
an assignment unit configured to assign a recognition disable code to the handwritten character for search as a character code if the similarity is less than a reference value and assign a text code of the corresponding character to the handwritten character for search as a character code if the similarity is not less than the reference value; and
a search unit configured to search for data stored in said storage unit by using the assigned character code,
wherein if the assigned character code includes the recognition disable code, said search unit executes search based on a similarity between handwriting trail data of the handwritten character for search and the handwriting trail data stored in said storage unit corresponding to the recognition disable code.

2. The apparatus according to claim 1, wherein if the character code assigned by said assignment unit includes the recognition disable code, said search unit evaluates an occupied area ratio of the handwriting trail data stored in said storage unit with respect to a region capable of containing the handwritten character and executes search based on the similarity and the ratio.

3. A handwriting processing method using a handwriting processing apparatus having a storage unit configured to store a character code of each character contained in a character string, with handwriting trail data of a handwritten character corresponding to a recognition disable code if the character code includes the recognition disable code, an input device configured to input a handwritten character for search, and a dictionary which stores a shape of each of a plurality of characters, the method comprising the steps of:
a CPU of the handwriting processing apparatus recognizing a corresponding character in the dictionary with respect to the handwritten character for search based on a similarity between the handwritten character for search input to the input device and the shape of each of the characters stored in the dictionary;
the CPU assigning a recognition disable code to the handwritten character for search as a character code if the similarity is less than a reference value and assigning a text code of the corresponding character to the handwritten character for search as a character code if the similarity is not less than the reference value; and
searching for data stored in the storage unit by using the assigned character code,
wherein in the searching step, if the assigned character code includes the recognition disable code, search is executed based on a similarity between handwriting trail data of the handwritten character for search and the handwriting trail data stored in the storage unit corresponding to the recognition disable code.

4. The method according to claim 3, wherein in the searching step, if the character code assigned in the assigning step includes the recognition disable code, an occupied area ratio of the handwriting trail data stored in the storage unit with respect to a region capable of containing the handwritten character is evaluated, and search is executed based on the similarity and the ratio.

5. A computer program stored on a non-transitory computer-readable storage medium for controlling a handwriting processing apparatus having a computer executing the program, a storage unit configured to store a character code of each character contained in a character string, with handwriting trail data of a handwritten character corresponding to a recognition disable code if the character code includes the recognition disable code, an input unit configured to input a handwritten character for search, and a dictionary which stores a shape of each of a plurality of characters, the program comprising code for performing the following steps of:
recognizing a corresponding character in said dictionary with respect to the handwritten character for search based on a similarity between the handwritten character for search input to the input unit and the shape of each of the characters stored in the dictionary;
assigning a recognition disable code to the handwritten character for search as a character code if the similarity is less than a reference value and assigning a text code of the corresponding character to the handwritten character for search as a character code if the similarity is not less than the reference value; and
searching for data stored in the storage unit by using the assigned character code,
wherein in the searching step, if the assigned character code includes the recognition disable code, search is executed based on a similarity between handwriting trail data of the handwritten character for search and the handwriting trail data stored in the storage unit corresponding to the recognition disable code.

6. The program according to claim 5, wherein in the searching step, if the character code assigned in the assigning step includes the recognition disable code, an occupied area ratio of the handwriting trail data stored in the storage unit with respect to a region capable of containing the handwritten character is evaluated, and search is executed based on the similarity and the ratio.

* * * * *